United States Patent
Hu et al.

(10) Patent No.: US 10,534,552 B2
(45) Date of Patent: Jan. 14, 2020

(54) SR-IOV-SUPPORTED STORAGE RESOURCE ACCESS METHOD AND STORAGE CONTROLLER AND STORAGE DEVICE

(71) Applicant: HUAWEI TECHNOLOGIES CO., LTD., Shenzhen, Guangdong (CN)

(72) Inventors: Haiyan Hu, Hangzhou (CN); Shaofeng Shen, Hangzhou (CN); Miao Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 15/581,095

(22) Filed: Apr. 28, 2017

(65) Prior Publication Data
US 2017/0235510 A1    Aug. 17, 2017

Related U.S. Application Data

(63) Continuation of application No. PCT/CN2015/092877, filed on Oct. 26, 2015.

(30) Foreign Application Priority Data

Oct. 31, 2014 (CN) .......................... 2014 1 0607052

(51) Int. Cl.
*G06F 3/06* (2006.01)
*G06F 13/16* (2006.01)
(Continued)

(52) U.S. Cl.
CPC .......... *G06F 3/0622* (2013.01); *G06F 3/0631* (2013.01); *G06F 3/0659* (2013.01);
(Continued)

(58) Field of Classification Search
CPC .... G06F 3/0622; G06F 3/0631; G06F 3/0659; G06F 3/0679; G06F 9/45558; G06F 9/5016; G06F 13/32; G06F 13/4282
See application file for complete search history.

(56) References Cited

U.S. PATENT DOCUMENTS

9,389,895 B2    7/2016  Oshins et al.
2011/0179414 A1*  7/2011  Goggin ................... G06F 3/061
                                                            718/1
(Continued)

FOREIGN PATENT DOCUMENTS

CN    102652305 A    8/2012
CN    102801806 A    11/2012
(Continued)

OTHER PUBLICATIONS

Extended European Search Report dated Sep. 26, 2017 in corresponding European Patent Application No. 15855076.4.
(Continued)

*Primary Examiner* — Tim T Vo
*Assistant Examiner* — Harry Z Wang
(74) *Attorney, Agent, or Firm* — Staas & Halsey LLP

(57) ABSTRACT

An SR-IOV-supported storage resource access method is disclosed, the method includes: consolidating a storage medium as a unified storage resource, and dividing the unified storage resource into multiple storage sub-resources; allocating the storage sub-resources to at least one of a PF or a VF according to a preset allocation rule, and maintaining a resource allocation table including a mapping relationship between the storage sub-resources and at least one of PF or VF; receiving a host command sent by a virtual machine to a destination VF or by a virtual machine monitor to a destination PF; and searching the resource allocation table according to destination VF or destination PF, and performing, on a storage sub-resource corresponding to destination
(Continued)

PF or destination VF and according to the mapping relationship between the storage sub-resources and the PF or the VF in the resource allocation table, an operation corresponding to the host command.

20 Claims, 6 Drawing Sheets

(51) Int. Cl.
G06F 9/455 (2018.01)
G06F 9/50 (2006.01)
G06F 13/32 (2006.01)
G06F 13/42 (2006.01)
G06F 12/02 (2006.01)

(52) U.S. Cl.
CPC ........ *G06F 3/0679* (2013.01); *G06F 9/45558* (2013.01); *G06F 9/5016* (2013.01); *G06F 13/16* (2013.01); *G06F 13/32* (2013.01); *G06F 13/4282* (2013.01); *G06F 12/0246* (2013.01); *G06F 2009/45579* (2013.01); *G06F 2009/45583* (2013.01); *G06F 2212/7202* (2013.01); *G06F 2213/0026* (2013.01)

(56) References Cited

U.S. PATENT DOCUMENTS

| | | | |
|---|---|---|---|
| 2011/0239213 A1* | 9/2011 | Aswani | G06F 9/45558 718/1 |
| 2012/0102491 A1* | 4/2012 | Maharana | G06F 9/45558 718/1 |
| 2014/0019969 A1 | 1/2014 | Goggin et al. | |
| 2014/0250338 A1* | 9/2014 | Prabhakaran | G06F 11/0757 714/56 |
| 2014/0281040 A1 | 9/2014 | Liu | |
| 2015/0254093 A1* | 9/2015 | Ho | G06F 9/45558 718/1 |
| 2016/0062802 A1* | 3/2016 | Guan | G06F 9/4881 711/148 |
| 2016/0098367 A1* | 4/2016 | Etsion | G06F 13/32 710/308 |

FOREIGN PATENT DOCUMENTS

| | | | |
|---|---|---|---|
| CN | 104049912 A | | 9/2014 |
| CN | 104461958 A | | 3/2015 |
| GB | 1415796.0 | * | 9/2014 |

OTHER PUBLICATIONS

International Search Report, dated Jan. 13, 2016, in International Application No. PCT/CN2015/092877 (4 pp.).

International Search Report dated Jan. 13, 2016 in corresponding International Patent Application No. PCT/CN2015/092877.

Chinese Office Action dated Mar. 1, 2017 in corresponding Chinese Patent Application No. 201410607052.5.

* cited by examiner

SR-IOV-SUPPORTED STORAGE RESOURCE ACCESS METHOD AND STORAGE CONTROLLER AND STORAGE DEVICE

CROSS-REFERENCE TO RELATED APPLICATIONS

This application is a continuation of International Application No. PCT/CN2015/092877, filed on Oct. 26, 2015, which claims priority to Chinese Patent Application No. 201410607052.5, filed on Oct. 31, 2014. The disclosures of the aforementioned applications are hereby incorporated by reference in their entireties.

TECHNICAL FIELD

The present invention relates to the field of communications technologies, and in particular, to a single-root input/output virtualization SR-IOV-supported storage resource access method and storage controller, and a storage device.

BACKGROUND

Single-root input/output (Input/Output, I/O) virtualization (Single Root I/O Virtualization, SR-IOV) is an extension of the Peripheral Component Interconnect Express (PCIe) bus interface standard, and prompts various system images or users to randomly access a subset on a physical I/O resource, to obtain better data mobility and share an infrastructure hardware resource.

A PCIe solid state drive (Solid State Drive, SSD) features high bandwidth, high IOPS (Input/Output Operations Per Second, input/output operations per second), and low latency. Therefore, has a great potential.

However, in the prior art, there is no implementation method that enables a storage device (for example, the PCIe SSD) to support SR-IOV. Therefore, existing storage devices cannot support the SR-IOV, and cannot better implement hardware resource sharing to improve utilization of a storage resource in the storage device.

SUMMARY

Embodiments of the present invention provide an SR-IOV-supported storage resource access method and storage controller, and a storage device, to resolve a problem exiting in the prior art that a storage device cannot better implement hardware resource sharing and improve utilization of a storage resource in the storage device.

According to a first aspect, an embodiment of the present invention provides a method for implementing a single-root input/output virtualization-supported controller, where the method is executed by a storage controller in a storage device, the storage device further includes a storage medium, the storage controller is configured to separately connect a host and the storage medium, the host runs a virtual machine monitor and one or more virtual machines, the storage controller includes a physical function PF and one or more virtual functions VF related to the PF, the PF directly communicates with the virtual machine monitor, and each VF directly communicates with a virtual machine; and the method includes:

consolidating the storage medium as a unified storage resource, and dividing the unified storage resource into multiple storage sub-resources;

allocating the storage sub-resources to at least one of the PF or the VF according to a preset allocation rule, and maintaining a resource allocation table, where the resource allocation table includes a mapping relationship between the storage sub-resources and at least one of the PF or the VF;

receiving a host command sent by the virtual machine to a destination VF or sent by the virtual machine monitor to a destination PF; and searching the resource allocation table according to the destination VF or the destination PF, and performing, on a storage sub-resource corresponding to the destination PF or the destination VF and according to the mapping relationship between the storage sub-resources and the PF or the VF in the resource allocation table, an operation corresponding to the host command.

In a first possible implementation manner of the first aspect, the host includes a memory, the memory includes at least one queue, and at least one of the PF or the VF is corresponding to one or more different queues; and the receiving a host command sent by the virtual machine to a destination VF or sent by the virtual machine monitor to a destination PF includes:

after learning that the host puts the host command in the queue in the host memory, initiating a direct memory access DMA operation, to obtain the host command from a queue that is of the queue in the host memory and corresponding to the destination VF or the destination PF.

With reference to the first possible implementation manner of the first aspect, in a second possible implementation manner, the storage controller further includes multiple interrupt resources, the multiple interrupt resources are allocated to the queue in the host memory, so that one or more queues are corresponding to one interrupt resource, and the method further includes:

transmitting, to the host memory by using the DMA operation, a controller command that needs to be sent to the host; and instructing, by using an interrupt resource corresponding to a destination queue of the destination VF or the destination PF, the host to obtain the controller command, where the destination queue of the destination VF or the destination PF is the queue that is of the queue in the host memory and corresponding to the destination VF or the destination PF.

With reference to the second possible implementation manner of the first aspect, in a third possible implementation manner, the interrupt resource is an MSI-x interrupt, and each queue in the host memory is corresponding to one MSI-x interrupt.

With reference to the first aspect or any one of the first to third possible implementation manners of the first aspect, in a fourth possible implementation manner, the host command includes storage sub-resource relative identifiers ID used to identify the storage sub-resources, and the storage sub-resources in the resource allocation table are identified by using storage sub-resource absolute IDs; and the searching the resource allocation table according to the destination VF or the destination PF, and performing, on a storage sub-resource corresponding to the destination VF or the destination VF and according to the mapping relationship between the storage sub-resources and the PF or the VF in the resource allocation table, an operation corresponding to the host command include:

finding, according to the mapping relationship between the storage sub-resources and the PF or the VF in the resource allocation table, the storage sub-resource corresponding to the destination VF or the destination PF, finding, according to a correspondence between a storage sub-resource relative ID and a storage sub-resource absolute ID, a storage sub-resource absolute ID corresponding to a storage sub-resource relative ID carried in the host command, and performing the operation on the storage sub-resource corresponding to the found storage sub-resource absolute ID.

With reference to the first aspect or any one of the first to fourth possible implementation manners of the first aspect, in a fifth possible implementation manner, the allocating the storage sub-resources to at least one of the PF or the VF according to a preset allocation rule, and maintaining a resource allocation table include:

allocating at least one storage sub-resource to the PF according to the preset allocation rule, and storing a mapping relationship between the storage sub-resource and the PF into the resource allocation table; or allocating at least one storage sub-resource to one VF according to the preset allocation rule, and storing a mapping relationship between the at least one storage sub-resource and the VF into the resource allocation table; or allocating one storage sub-resource to multiple VFs according to the preset allocation rule, and storing a mapping, relationship between the storage sub-resource and each VF into the resource allocation table.

With reference to the first aspect or any one of the first to fifth possible implementation manners of the first aspect, in a sixth possible implementation manner, the PF is configured to execute a global storage controller function, and the global storage controller function includes at least one of implementation of a Firmware Download or Firmware Active command, implementation of a Format command, or a power-off function in total reset.

According to a second aspect, an embodiment of the present invention provides a single-root input/output virtualization-supported storage controller, where the storage controller is configured to separately connect a host and a storage medium, the host runs a virtual machine monitor and one or more virtual machines, the storage controller includes a physical function PF and one or more virtual functions VF related to the PF, the VF directly communicates with the virtual machine monitor, and each VF directly communicates with a virtual machine; and the storage controller includes:

a consolidation module, configured to: consolidate the storage medium as a unified storage resource, and divide the unified storage resource into multiple storage sub-resources;

an allocation module, configured to: allocate, to at least one of the PF or the VF according to a preset allocation rule, the storage sub-resources divided by the consolidation module, and maintain a resource allocation table, where the resource allocation table includes a mapping relationship between the storage sub-resources and at least one of the PF or the VF;

a receiving module, configured to receive a host command sent by the virtual machine to a destination VF or sent by the virtual machine monitor to a destination PF; and an operation module, configured to: search the resource allocation table according to the destination VF or the destination PF, and perform, on a storage sub-resource corresponding to the destination PF or the destination VF and according to the mapping relationship between the storage sub-resources and the PF or the VF in the resource allocation table, an operation corresponding to the host command received by the receiving module.

In a first possible implementation manner of the second aspect, the host includes a memory, the memory includes at least one queue, and at least one of the PF or the VF is corresponding to one or more different queues; and the receiving module is specifically configured to:

after learning that the host puts the host command in the queue in the host memory, initiate a direct memory access DMA operation, to obtain the host command from a queue that is of the queue in the host memory and corresponding to the destination VF or the destination PF.

With reference to the first possible implementation manner of the second aspect, in a second possible implementation manner, the storage controller further includes multiple interrupt resources, the multiple interrupt resources are allocated to the queue in the host memory, so that one or more queues are corresponding to one interrupt resource; and the storage controller further includes:

a transmission module, configured to transmit, to the host memory by using the DMA operation, a controller command that needs to be sent to the host; and an instructing module, configured to instruct, by using an interrupt resource corresponding to a destination queue of the destination VF or the destination PF, the host to obtain the controller command, where the destination queue of the destination VF or the destination PF is the queue that is of the queue in the host memory and corresponding to the destination VF or the destination PF.

With reference to the second possible implementation manner of the second aspect, in a third possible implementation manner, the interrupt resource is an MSI-x interrupt, and each queue in the host memory is corresponding to one MSI-x interrupt.

With reference to the second aspect or any one of the first to third possible implementation manners of the second aspect, in a fourth possible implementation manner, the host command includes storage sub-resource relative identifiers ID used to identify the storage sub-resources, and the storage sub-resources in the resource allocation table are identified by using storage sub-resource absolute IDs; and the operation module is specifically configured to:

find, according to the mapping relationship between the storage sub-resources and the PF or the VF in the resource allocation table, the storage sub-resource corresponding to the destination VF or the destination PF, find, according to a correspondence between a storage sub-resource relative ID and a storage sub-resource absolute ID, a storage sub-resource absolute ID corresponding to a storage sub-resource relative ID carried in the host command, and perform the operation on the storage sub-resource corresponding to the found storage sub-resource absolute ID.

With reference to the second aspect or any one of the first to fourth possible implementation manners of the second aspect, in a fifth possible implementation manner, the allocation module is specifically configured to:

allocate at least one storage sub-resource to the PF according to the preset allocation rule, and store a mapping relationship between the storage sub-resource and the PF into the resource allocation table; or allocate at least one storage sub-resource to one VF according to the preset allocation rule, and store a mapping relationship between the at least one storage sub-resource and the VF into the resource allocation table; or allocate one storage sub-resource to multiple VFs according to the preset allocation rule, and store a mapping relationship between the storage sub-resource and each VF into the resource allocation table.

With reference to the second aspect or any one of the first to fifth possible implementation manners of the second aspect, in a sixth possible implementation manner, the PF is configured to execute a global storage controller function, and the global storage controller function includes at least one of implementation of a Firmware Download or Firmware Active command, implementation of a Format command, or a power-off function in total reset.

According to a third aspect, an embodiment of the present invention provides a storage device, including a storage controller and a storage medium, where the storage controller is connected to the storage medium and configured to connect an external host, so that the host reads and writes data in the storage medium by using the storage controller, the host nuts a virtual machine monitor and one or more virtual machines, the storage controller includes a physical function PF and one or more virtual functions VF related to the PF, the PF directly communicates with the virtual machine monitor, and each VF directly communicates with a virtual machine; and the storage controller is configured to:

consolidate the storage medium as a unified storage resource, and divide the unified storage resource into multiple storage sub-resources;

allocate the storage sub-resources to at least one of the PF or the VF according to a preset allocation rule, and maintain a resource allocation table, where the resource allocation table includes a mapping relationship between the storage sub-resources and at least one of the PF or the VF;

receive a host command sent by the virtual machine to a destination VF or sent by the virtual machine monitor to a destination PF; and search the resource allocation table according to the destination VF or the destination PF, and perform, on a storage sub-resource corresponding to the destination PF or the destination VF and according to the mapping relationship between the storage sub-resources and the PF or the VF in the resource allocation table, an operation corresponding to the host command.

In a first possible implementation manner of the third aspect, the host includes a memory, the memory includes at least one queue, and at least one of the PF or the VF is corresponding to one or more different queues; and when the storage controller is configured to receive the host command sent by the virtual machine to the destination VF or sent by the virtual machine monitor to the destination PF, the storage controller is specifically configured to:

after learning that the host puts the host command in the queue in the host memory, initiate a direct memory access DMA operation, to obtain the host command from a queue that is of the queue in the host memory and corresponding to the destination VF or the destination PF.

With reference to the first possible implementation manner of the third aspect, in a second possible implementation manner, the storage controller further includes multiple interrupt resources, the multiple interrupt resources are allocated to the queue in the host memory, so that one or more queues are corresponding to one interrupt resource, and the storage controller is further configured to:

transmit, to the host memory by using the DMA operation, a controller command that needs to be sent to the host; and instruct, by using an interrupt resource corresponding to a destination queue of the destination VF or the destination PF, the host to obtain the controller command, where the destination queue of the destination VF or the destination PF is the queue that is of the queue in the host memory and corresponding to the destination VF or the destination PF.

With reference to the second possible implementation manner of the third aspect, in a third possible implementation manner, the interrupt resource is an MSI-x interrupt, and each queue in the host memory is corresponding to one MSI-x interrupt.

With reference to the third aspect or any one of the first to third possible implementation manners of the third aspect, in a fourth possible implementation manner, the host command includes storage sub-resource relative identifiers ID used to identify the storage sub-resources, and the storage sub-resources in the resource allocation table are identified by using storage sub-resource absolute IDs; and when the storage controller is configured to: search the resource allocation table according to the destination VF or the destination PF, and perform, on the storage sub-resource corresponding to the destination PF or the destination VF and according to the mapping relationship between the storage sub-resources and the PF or the VF in the resource allocation table, the operation corresponding to the host command, the storage controller is specifically configured to:

find, according to the mapping relationship between the storage sub-resources and the PF or the VF in the resource allocation table, the storage sub-resource corresponding to the destination VF or the destination PF, find, according to a correspondence between a storage sub-resource relative ID and a storage sub-resource absolute ID, a storage sub-resource absolute ID corresponding to a storage sub-resource relative ID carried in the host command, and perform the operation on the storage sub-resource corresponding to the found storage sub-resource absolute ID.

With reference to the third aspect or any one of the first to fourth possible implementation manners of the third aspect, in a fifth possible implementation manner, when the storage controller is configured to: allocate the storage sub-resources to at least one of the PF or the VF according to the preset allocation rule, and maintain the resource allocation table, the storage controller is specifically configured to:

allocate at least one storage sub-resource to the PF according to the preset allocation rule, and store a mapping relationship between the storage sub-resource and the PF into the resource allocation table; or allocate at least one storage sub-resource to one VF according to the preset allocation rule, and store a mapping relationship between the at least one storage sub-resource and the VF into the resource allocation table; or allocate one storage sub-resource to multiple VFs according to the preset allocation rule, and store a mapping relationship between the storage sub-resource and each VF into the resource allocation table.

According to a fourth aspect, an embodiment of the present invention provides a storage system, where the storage system includes a host and the storage device in the third aspect or any one of the possible implementation manners of the third aspect.

In the embodiments of the present invention, a storage medium in a storage device is consolidated and allocated, an operation is performed, according to a command sent by a virtual machine or a virtual machine monitor, on a storage sub-resource corresponding to a VF or a PF receiving the command, and how the storage device specifically implements an SR-IOV-supported implementation manner is provided. Therefore, utilization of a storage resource in the storage device can be improved, and performance of the storage device can be improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the all based on the embodiments of the present invention without creative efforts shall fall within the protection scope of the present invention.

Embodiment 1

Figure 1:
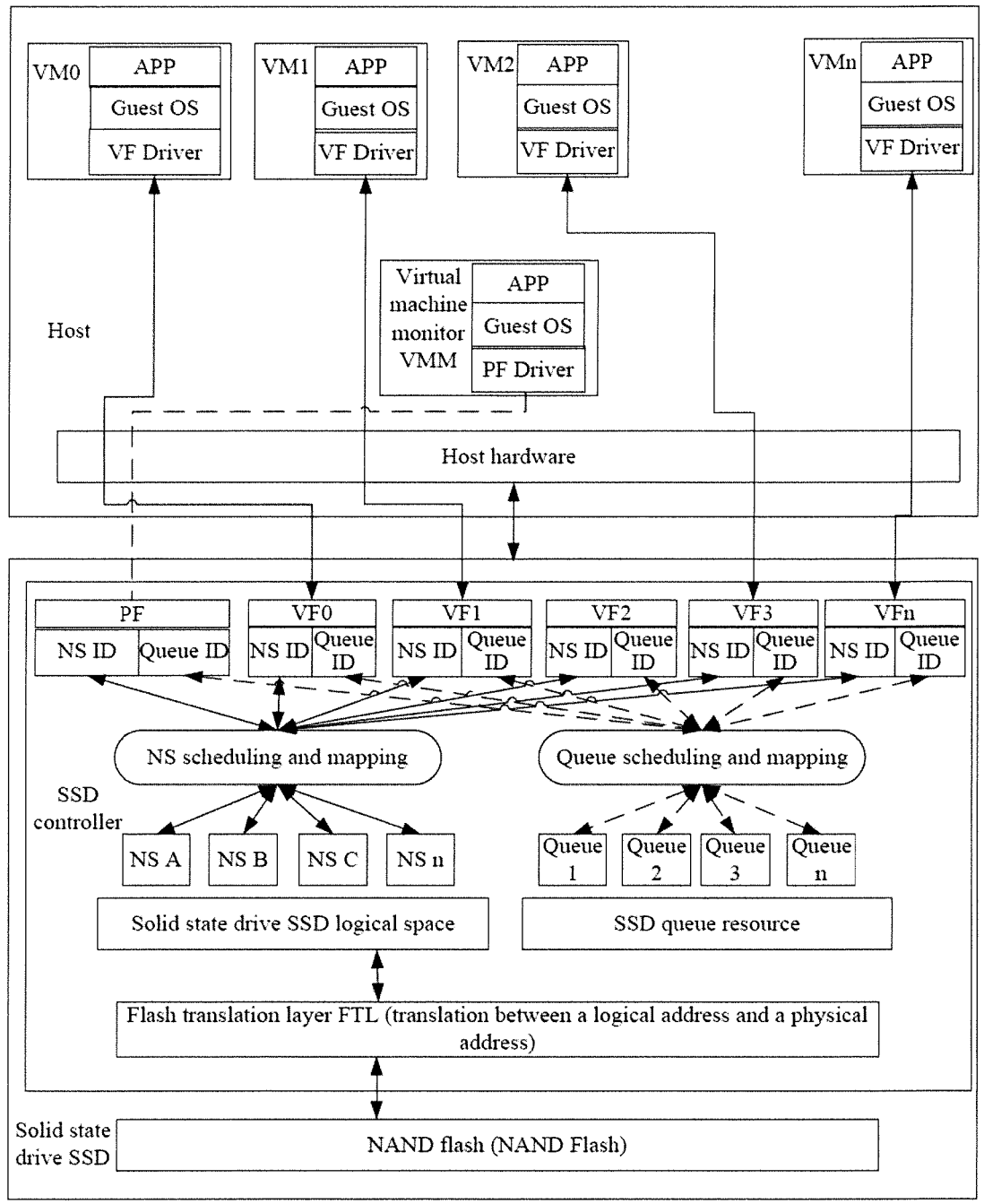
FIG. 1 is a schematic diagram of a system structure of a PCIe SSD according to an embodiment of the present invention.

A method for implementing a single-root input/output virtualization-supported controller described in this embodiment of the present invention may be executed by a storage controller in a storage device. For example, as shown in FIG. 1, the storage device may be a solid state drive SSD. The SSD includes a storage controller (an SSD controller) and a storage medium (also referred to as a "storage resource" or a "physical storage resource", which may be specifically NAND flash). The storage controller is connected to the storage medium and is connected to a host (which may be connected to the host by using a high-speed interface such as a PCIe interface), so that the host reads and writes data in the storage medium by using the storage controller.

In this embodiment of the present invention, the host may be a server, a PC, or another computation unit that needs to be connected to a storage device. The host includes a virtual machine monitor VMM and one or more virtual machines VM (including a VM0, a VM1, a VM2, . . . , a VMn, where n is a natural number). The storage controller includes a PF and one or more VFs (for example, a VF0, a VF1, a VF2, . . . , a VFn shown in this figure, where n is a natural number) related to the PF. In this embodiment of the present invention, the host may communicate with the storage controller based on an NVMe protocol. The PF directly communicates with the virtual machine monitor, and each VF directly communicates with a virtual machine. For example, the PF may directly communicate with the virtual machine monitor VMM, the VF1 may directly communicate with the VM1, and the VF2 may directly communicate with the VM2. A technology of direct communication between the PF and the virtual machine monitor and between the VF and the VM is a technology well known to a person skilled in the art. Therefore, details are not described herein.

Figure 2:
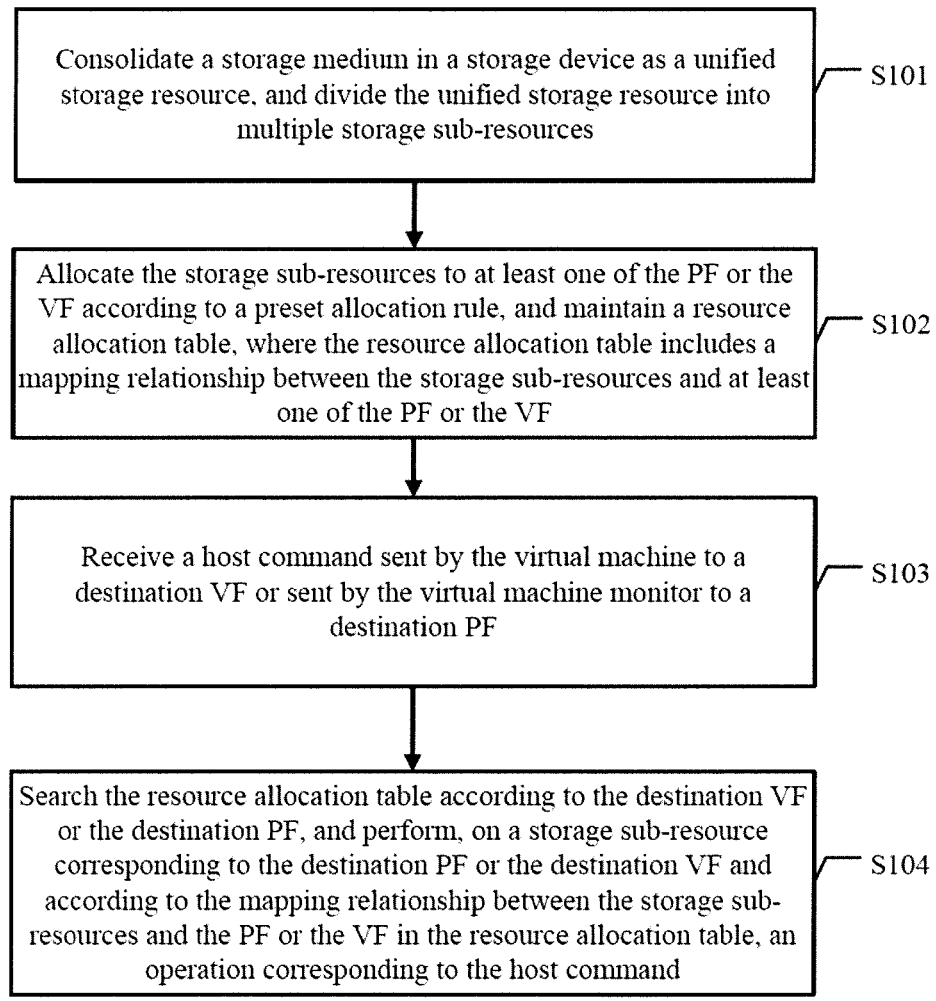
FIG. 2 is a schematic flowchart of an embodiment of an SR-IOV-supported storage resource access method according to an embodiment of the present invention.

Referring to FIG. 2, an SR-IOV-supported storage resource access method described in this embodiment of the present invention includes the following steps.

S101. Consolidate the storage medium in the storage device as a unified storage resource, and divide the unified storage resource into multiple storage sub-resources.

Optionally, the storage device described in this embodiment of the present invention may be specifically a PCIe SSD (that is, an SSD whose interface is a PCIe interface). The storage medium included in the storage device may be specifically NAND flash. In specific implementation, to better allocate the storage medium in the PCIe SSD to a PF and each VF, the storage controller may consolidate the storage medium in the PCIe SSD as a unified storage resource and divide the unified storage resource into multiple storage sub-resources, so as to allocate the multiple storage sub-resources to the PF and each VF.

Specifically, as shown in FIG. 1, the storage controller may map, by using a flash translation layer (Flash Translation Layer, FTL) technology, the NAND flash into a single logical space (that is, an SSD logical space), and the single logical space is indicated by using an absolute logical block address (Logical Block Address, LBA), for example, Abs_Start_LBA~Abs_End_LBA. The single logical space is the unified storage resource obtained by consolidating the NAND flash. After the NAND flash is mapped into the single logical space, the single logical space is divided into different segments, that is, the single logical space is divided into multiple LBA ranges. Each segment (that is, each LBA range) is a namespace Namespace (NS for short). Sizes of the NSs may be same or different, which are not limited herein. The NSs obtained by dividing the single logical space are the storage sub-resources obtained by dividing the unified storage resource. The storage controller may record an absolute LBA range for each NS in the single logical space (that is, a global logical space). Further, the NSs may be allocated to the PF or the VF for use.

S102. Allocate the storage sub-resources to at least one of the PF or the VF according to a preset allocation rule, and maintain a resource allocation table, where the resource allocation table includes a mapping relationship between the storage sub-resources and at least one of the PF or the VF.

In some feasible implementation manners, after consolidating the storage medium in the PCIe SSD as the unified storage resource by using the PF, and dividing the unified storage resource into the multiple storage sub-resources, the storage controller may allocate the storage sub-resources to the PF or the VF according to the preset allocation rule and maintain the resource allocation table. Specifically, the storage controller may allocate the storage sub-resources to the PF or the VF according to an allocation command sent by the virtual machine monitor. The resource allocation table includes the mapping relationship between the storage sub-resources and the PF or the VF. Specifically, the resource allocation table further includes identifier information of the PF and identifier information of each VF related to the PF. The storage controller may establish a mapping relationship between the identifier information of the PF and a storage medium allocated to the PF, to search, by using the identifier information of the PF, for the storage medium allocated to the PF. The storage controller may further establish a mapping relationship between identifier information of a VF and a storage medium allocated to the VF, to search, by using the identifier information of the VF, for the storage medium allocated to the VF. The storage controller may allocate the storage sub-resources to the PF or the VF according to the allocation command sent by the virtual machine monitor.

S103. Receive a host command sent by the virtual machine to a destination VF or sent by the virtual machine monitor to a destination PF.

In this embodiment, the "host command" is a command, for example, an I/O command, sent by the host. Specifically, the host command may be sent by the virtual machine or the virtual machine monitor running on the host.

Optionally, in specific implementation, the host described in this embodiment includes a memory. During running, the host memory includes at least one queue, and the PF or the VF is corresponding to one or more different queues. The virtual machine or the virtual machine monitor may use a queue to send the host command. Specifically, when a queue is used to send the host command by the virtual machine or the virtual machine monitor, data corresponding to the host command is written into storage space corresponding to the queue. In this embodiment, the virtual machine or the virtual machine monitor in the host may put the host command in the queue that is in the host memory and corresponding to the destination VF or the destination PF, and then instruct the storage controller to obtain the host command from the queue in the host memory.

After learning that the host puts the host command in the queue in the host memory, the storage controller may initiate a direct memory access (Direct Memory Access, DMA) operation, to obtain the host command from the queue that is of the queue in the host memory and corresponding to the destination VF or the destination PF.

S104. Search the resource allocation table according to the destination VF or the destination PF, and perform, on a storage sub-resource corresponding to the destination PF or the destination VF and according to the mapping relationship between the storage sub-resources and the PF or the VF in the resource allocation table, an operation corresponding to the host command.

Optionally, in specific implementation, the virtual machine monitor sends the command to the PF in a straight-through manner. When receiving the host command by using the queue corresponding to the destination PF, the storage controller may obtain the identifier information of the PF. In addition, a function module implementing PCIe communication in the storage controller may learn, by using an SR-IOV straight-through mode, to which VF (for example, the VF1), that is, the destination VF, the I/O command sent by the virtual machine is directly transmitted, and may further add identifier information of the VF1 (for example, ID of the VF1) to a control field in a PCIe packet and send, to a processing module in the storage controller, the packet carrying the identifier information of the VF1. The processing module in the storage controller may parse the PCIe packet carrying the identifier information of the VF1 and obtain the identifier information of the VF1 from the PCIe packet.

In specific implementation, after obtaining the identifier information of the PF or the identifier information of the VF, the storage controller may search the resource allocation table according to the identifier information of the PF or the identifier information of the VF, to obtain, by searching the resource allocation table, a storage sub-resource allocated to the PF or the VF, and may further perform, on the storage sub-resource corresponding to the PF or the storage sub-resource corresponding to the VF, the operation corresponding to the host command. After obtaining the storage sub-resource (which may be specifically an NS) corresponding to the PF, the storage controller may transmit data in the NS to a physical memory address of the host in a DMA manner. After data transmission is complete, the storage controller may generate a controller command in response to the host command, transmit the controller command to the host memory in the DMA manner, and send an interrupt by using an interrupt resource corresponding to a destination queue of the destination PF or the destination VF, to instruct the host to obtain the controller command.

Optionally, in this embodiment of the present invention, the PF may be configured to execute a global storage controller function in the NVMe protocol. The global storage controller function includes implementation of a Firmware Download or Firmware Active command, implementation of a Format command, a power-off function in total reset, or the like. In this embodiment of the present invention, the VF is configured to implement a lightweight SSD controller function, including a disk IO function and a small part of the SSD control function, and the global function is implemented only by the PF. For example, a host interface protocol NVMe is used as an example. A command, such as the Firmware Download or the Firmware Active, is a global command and can be implemented only by the PF, but not supported by the VF. Therefore, if the virtual machine delivers the Firmware Download or the Firmware Active, the VF returns a failure. For the Format command, both the PF and the VF can support secure erase of a Namespace; and a Chang LBA Format is supported only by the PF. For a power-off policy, after receiving a power-off instruction, the VF resets a resource, including an IO queue and the like, related only to the VF; after receiving the power-off instruction, in addition to resetting a resource of the PF, the PF still needs to instruct to perform total reset, including storing a background NAND flash management entry.

In this embodiment of the present invention, the PF in the storage controller may further be configured to implement functions such as enabling of single-root I/O virtualization, searching and allocation of the storage medium in the storage device, and maintenance of the resource allocation table. Specifically, the virtual machine monitor in the host may load a PF driver, enable an SR-IOV function, create a management queue, and drive, by using the PF, the management queue to deliver a resource searching command to the PF. After receiving the searching command, the PF may return statuses of the storage medium, an interrupt resource, and a queue resource included in the storage device to the virtual machine monitor. After receiving the statuses that are of the storage medium, the interrupt resource, and the queue resource and returned by the PF, the virtual machine monitor may send the allocation command to the PF. The PF may parse the allocation command, divide the unified storage resource into the multiple storage sub-resources according to the allocation command, and further allocate the storage sub-resources, the queue resource, and the interrupt resource to the PF or the VF.

In this embodiment of the present invention, a storage controller may consolidate a storage medium in a storage device as a unified storage resource, divide the unified storage resource into multiple storage sub-resources, further allocate the multiple storage sub-resources to a PF or a VF according to an allocation command sent by a host, and store a mapping relationship between the storage sub-resources and the PF or the VF into a resource allocation table. When receiving a command sent by a virtual machine or a virtual machine monitor, the storage controller may search the resource allocation table according to an identifier of a PF or a VF receiving the command, and perform an operation on a storage sub-resource according to the mapping relationship between the storage sub-resources and the PF or the VF. The method described in this embodiment of the present invention can support a single-root input/output virtualization technology. Therefore, I/O performance of the storage device and utilization of a storage resource in the storage device are improved.

Embodiment 2

Figure 3:
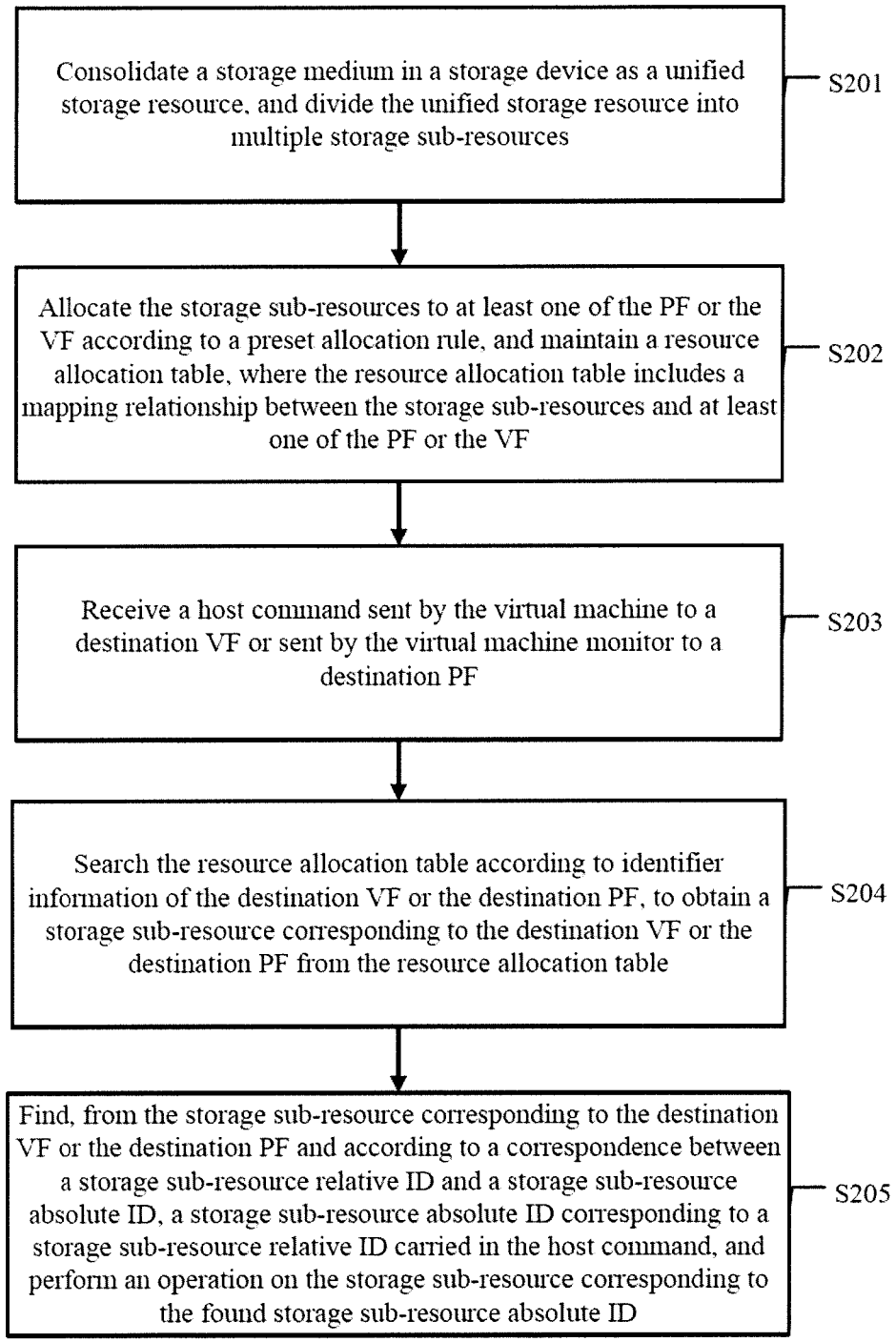
FIG. 3 is a schematic flowchart of another embodiment of an SR-IOV-supported storage resource access method according to an embodiment of the present invention.

Referring to FIG. 3, on a basis of the foregoing embodiment, this embodiment of the present invention provides an SR-IOV-supported storage resource access method, including the following steps.

S201. Consolidate a storage medium in a storage device as a unified storage resource, and divide the unified storage resource into multiple storage sub-resources.

Optionally, the method for implementing a single-root input/output virtualization-supported controller provided in this embodiment of the present invention may be executed by a storage controller. As shown in FIG. 1 for a structure relationship between the storage controller, a host, and the storage medium, reference may be made to content described in the method for implementing a single-root input/output visualization-supported controller provided in Embodiment 1 of the present invention. Therefore, details are not described herein again.

In specific implementation, for a specific implementation process that is described in this embodiment of the present invention and in which the storage medium in the storage device is consolidated as the unified storage resource and the unified storage resource is divided into the multiple storage sub-resources, reference may be made to step S101 in Embodiment 1 of the present invention. Therefore, details are not described herein again.

Figure 4:
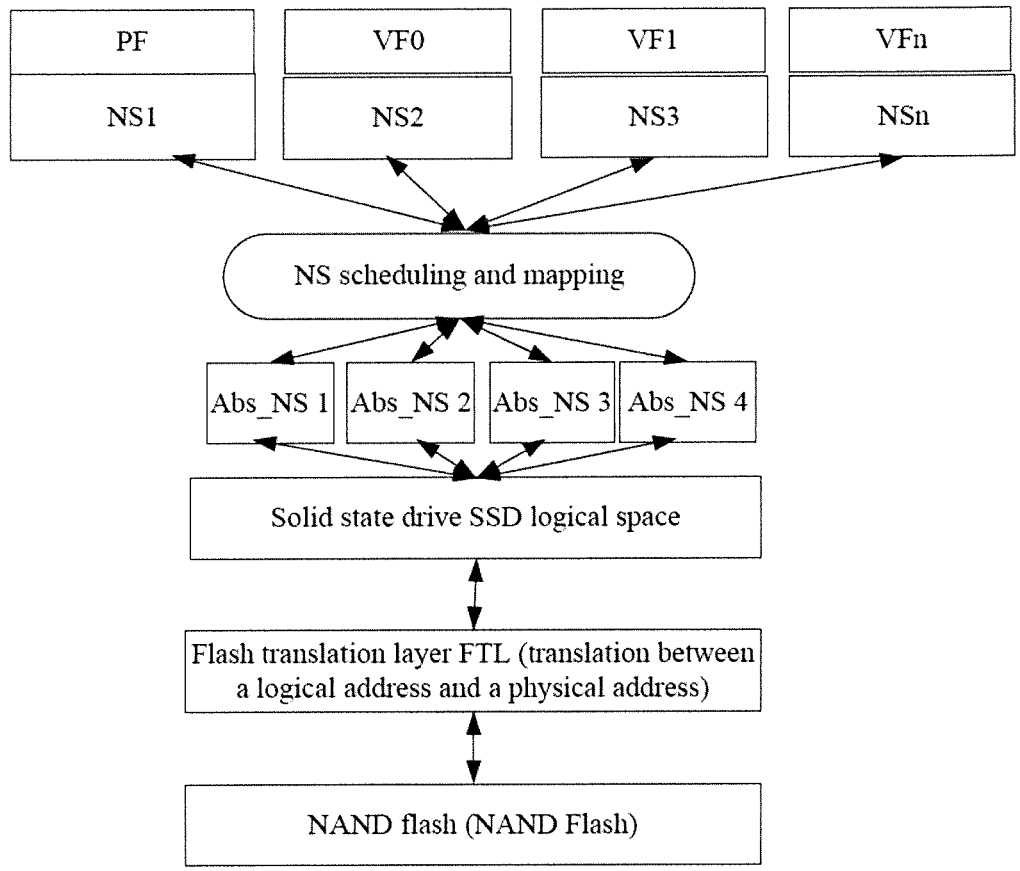
FIG. 4 is a schematic diagram of a NAND flash resource mapping according to an embodiment of the present invention.

Further, as shown in FIG. 4, FIG. 4 is a schematic diagram of a NAND flash resource mapping described in this embodiment of the present invention. The storage controller maps, by using an FTL technology function, NAND flash into a single logical space (an SSD logical space), where the single logical space is recorded as Abs_NS. A range of the single logical space (that is, the unified storage resource) is indicated by using a start point and an end point of an absolute LBA, for example, Abs_Start_LBA~Abs_End_LBA. The storage controller may divide the single logical space into N (N is a natural number) LBA ranges with different sizes (or LBA ranges with a same size, where the LBA ranges with different sizes are used as an example for specific description in the following) (that is, segments NSs, which may be recorded as, for example, Abs_NS1, Abs_NS2, Abs_NS3, . . . , Abs_NSn) according to a preset division rule. Specifically, the single logical space may first be divided into N NSs, and then a location (that is, an absolute logical space address) is recorded for each NS in the single logical space, including a start location and an end location, as shown in the following Table 1.

TABLE 1

| Abs_NS (Absolute logical space) | Start_LBA (Start location) | End_LBA (End location) |
| --- | --- | --- |
| Abs_NS1 | Abs_Start_LBA1 | Abs_End_LBA 1 |
| Abs_NS2 | Abs_Start_LBA2 | Abs_End_LBA2 |
| Abs_NS3 | Abs_Start_LBA3 | Abs_End_LBA3 |
| . . . | . . . | . . . |

In specific implementation, assuming that the range of the single logical space is 0x0000000 to 0x3ffffff that is, Abs_NS, 0x0000000 to 0x3ffffff, the storage controller may divide the single logical space into N (for example, 6) NSs with different sizes according to the preset division rule, and a start location and an end location of each NS are recorded as shown ill the following Table 2.

TABLE 2

| Abs_NS | Start_LBA (Start location) | End_LAB (End location) |
| --- | --- | --- |
| Abs_NS1 | 0x0000000 | 0x7fffff |
| Abs_NS2 | 0x8000000 | 0xffffff |
| Abs_NS3 | 0x1000000 | 0x17fffff |
| Abs_NS4 | 0x1800000 | 0x1fffff |
| Abs_NS5 | 0x2000000 | 0x2fffff |
| Abs_NS6 | 0x3000000 | 0x3fffff |

Optionally, the storage controller may further establish a correspondence between a queue in a host memory and the PF or the VF, so that the PF or the VF is corresponding to at least one NS and at least one queue (that is, at least one queue in the queue in the host memory), and each queue is corresponding to a different interrupt resource. As shown in FIG. 1, an NS or a queue corresponding to the PF or the VF may be marked by using an NS ID or a Queue IDs.

S202. Allocate the storage sub-resources to at least one of the PF or the VF according to a preset allocation rule, and maintain a resource allocation table, where the resource allocation table includes a mapping relationship between the storage sub-resources and at least one of the PF or the VF.

In specific implementation, for a specific implementation process of allocating, by the storage controller, the storage sub-resources to at least one of the PF or the VF and maintaining a resource allocation table, reference may be made to step S102 in Embodiment 1 of the present invention. Therefore, details are not described herein again.

Further, in this embodiment of the present invention, the resource allocation table may further include a mapping relationship between identifier information of the PF or the VF and a queue resource and an interrupt resource that are allocated to the PF or the VF. The queue resource is specifically identifier information of a queue (which may be specifically a queue number) that is in the host memory and is corresponding to a PF or a VF in a PCIe SSD, or the like. In this embodiment of the present invention, each queue is corresponding to a different interrupt resource, so that each PF is corresponding to at least one interrupt resource, and each VF is corresponding to at least one interrupt resource.

In specific implementation, the correspondence between the PF or the VF and the queue in the host memory may be specifically expressed as a correspondence between the PF or the VF and a queue number of the queue in the host memory, and the correspondence may further change according to a specific application scenario. That is, the queue number of the queue in the host memory may be re-allocated according to a specific application scenario, and the PF or the VF corresponding to the queue may be changed.

Optionally, for the PF in the storage controller, reference may be made to resource information such as all storage mediums and interrupt resources in the PCIe SSD and the queue that is in the host memory and corresponding to the PF or the VF. The interrupt resource may be specifically an extension MSI-x interrupt of a message signaled interrupt (Message Signaled Interrupt, MSI), and each queue in the host memory is corresponding to one MSI-x interrupt. In specific implementation, the interrupt resource may further be an MSI interrupt, each queue in the host memory is corresponding to one MSI interrupt, and a specific expression form of the interrupt resource is not limited herein.

Further, optionally, when allocating the storage sub-resources and the interrupt resource and establishing the correspondence between the queue (which may be specifically an I/O queue) in the host memory and the PF or the VF, the storage controller may allocate the storage sub-resources, an I/O queue resource (for example, a queue number of the I/O queue), or the interrupt resource to the PF or the VF by using the PF according to an allocation command sent by a virtual machine monitor. The allocation command may include the preset allocation rule. The PF may allocate one NS to one PF according to the preset allocation rule and store a mapping relationship between the NS and the PF into the resource allocation table.

Optionally, the PF may further allocate one or more NSs to one VF according to the preset allocation rule (the NS allocated to the VF is an absolute logical space of the VF) and store a mapping relationship between the NSs and the VF into the resource allocation table, or allocate one NS to multiple VFs according to the preset allocation rule, that is, different VFs may share a same NS, and store a mapping relationship between the NS and each VF into the resource allocation table. Similarly, the storage controller may further allocate, to the PF or the VF according to the preset allocation rule, an I/O queue resource in the PCIe SSD and an interrupt resource corresponding to the I/O queue resource, and store a mapping relationship between the I/O queue and the PF or the VF or a mapping relationship between the interrupt resource and the PF or the VF into the resource allocation table. In addition, the storage controller may further allocate, to one VF according to the preset allocation rule, a queue number of one or more queues in the host memory and an interrupt resource corresponding to the queue, and store a mapping relationship between a queue number of one or more I/O queues in the host memory and the VF or a mapping relationship between one or more interrupt resources and the VF into the resource allocation table.

In specific implementation, the resource allocation table further includes identifier information of the PF and identifier information of each VF related to the PF. The storage controller may establish a mapping relationship between identifier information of a PF and an NS, a queue number of an I/O queue, or an interrupt resource that is allocated to the PF, to search, according to the identifier information of the PF, for the NS, the queue number of the I/O queue, or the interrupt resource that is allocated to the PF. The storage controller may further establish a mapping relationship between identifier information of a VF and an NS, a queue number of an I/O queue, or an interrupt resource that is allocated to the VF, to search, according to the identifier information of the VF, for the NS, the queue number of the I/O queue, or the interrupt resource that is allocated to the VF, as shown in the following Table 3.

TABLE 3

| PF/VF (Identifier) | Logical space | I/O queue resource | Interrupt resource |
| --- | --- | --- | --- |
| PF0 | Abs_NS1 | Abs_Q1 | Abs_IRQ1 |
| VF1 | Abs_NS2, Abs_NS3, and Abs_NS4. | Abs_Q2, Abs_Q3, and Abs_Q4. | Abs_IRQ2, Abs_IRQ3, and Abs_IRQ4. |
| VF2 | Abs_NS3, and Abs_NS5. | Abs_Q5, and Abs_Q6. | Abs_IRQ5, and Abs_IRQ6. |
| VF3 | Abs_NS6, Abs_NS7, and Abs_NS8. | Abs_Q7, Abs_Q8, and Abs_Q9. | Abs_IRQ7, Abs_IRQ8, and Abs_IRQ9. |
| ... | ... | ... | ... |

S203. Receive a host command sent by the virtual machine to a destination VF or sent by the virtual machine monitor to a destination PF.

Optionally, the destination VF is a VF directly communicating with the virtual machine, and the PF is a PF directly communicating with the virtual machine monitor. In specific implementation, for a specific implementation process of receiving, by the storage controller, a host command sent by a virtual machine or a virtual machine monitor, reference may be made to step S103 in Embodiment 1 of the present invention. Therefore, details are not described herein again.

S204. Search the resource allocation table according to identifier information of the destination VF or the destination PF, to obtain a storage sub-resource corresponding to the destination VF or the destination PF from the resource allocation table.

In specific implementation, for a specific implementation process of searching, by the storage controller, the resource allocation table according to the identifier information of the destination PF or the destination VF, reference may be made to step S104 in Embodiment 1 of the present invention. Therefore, details are not described herein again.

S205. Find, from the storage sub-resource corresponding to the destination VF or the destination PF and according to a correspondence between a storage sub-resource relative ID and a storage sub-resource absolute ID, a storage sub-resource absolute ID corresponding to a storage sub-resource relative ID carried in the host command, and perform an operation on the storage sub-resource corresponding to the found storage sub-resource absolute ID.

In specific implementation, before the virtual machine requests a physical resource from the storage controller, the virtual machine may first send a searching command to the storage controller and then request, to the storage controller, to search for status information of the physical resource in the PCIe SSD. The searching command carries the identifier information of the destination PF or the destination VF. The storage controller may search the resource allocation table according to the identifier information of the destination PF or the destination VF, to determine a capability entry of the destination PF or the destination VF, where the capability entry includes a storage medium, an I/O queue resource, an interrupt resource, and the like that can be occupied by the destination PF or the destination VF. For example, a virtual machine 1 may search for a capability entry of a VF1 from the storage controller, as shown in the following Table 4.

TABLE 4

| Resource | Quantity |
|---|---|
| NS | 3 |
| I/O queue | 3 |
| Interrupt | 3 |

After obtaining the capability entry of the VF1, the virtual machine 1 may send the capability entry of the VF1 to the VF1. After learning information about resources, such as an NS, an I/O queue, and an interrupt resource, that can be occupied by the VF1, the VF1 may record the information about the resources, such as the NS, the I/O queue, and the interrupt resource, and establish relative IDs used to identify the NS, the I/O queue, and the interrupt resource. For example, the VF1 may establish relative IDs of the NS (that is, a storage sub-resource), the I/O queue, the interrupt resource, and the like that can be occupied by the VF1, for example, VF1: [NS1, NS2, NS3], [IO1, IO2, IO3], and [IRQ1, IRQ2, IRQ3], where [NS1, NS2, NS3] is a relative logical space of the VF1. Similarly, a VF2 may request, to the PF, to search for a capability entry of the VF2 and establish relative IDs of an NS, of an I/O queue, an interrupt resource, and the like that can be occupied by the VF2, for example, VF2: [NS1, NS2], [IO1, IO2], and [IRQ1, IRQ2].

After recording a capability entry of a VF that directly communicates with each virtual machine, each virtual machine may send an I/O command to the storage controller, where the I/O command includes identifier information of the VF, a relative ID of an NS in multiple NSs corresponding to the VF, a relative ID of an I/O queue in multiple I/O queues corresponding to the VF, a relative ID of an interrupt resource in multiple interrupt resources corresponding to the VF, and the like that are requested by the virtual machine, for example, a relative ID of the NS (NS1, NS2, or NS3) corresponding to the VF1, a relative ID of the I/O queue (IO1, IO2, or IO3) corresponding to the VF1, a relative ID of the interrupt resource (IRQ1, IRQ2, or IRQ3) corresponding to the VF1.

After receiving the I/O command, the storage controller may search the resource allocation table according to the identifier information of the VF, to obtain all NSs (Abs_NS2, Abs_NS3, and Abs_NS4), all I/O queue resources (Abs_Q2, Abs_Q3, and Abs_Q4), and all interrupt resources (Abs_IRQ2, Abs_IRQ3, and Abs_IRQ4) corresponding to the VF (for example, the VF1) from the resource allocation table, and further obtain, according to the correspondence between a storage sub-resource relative ID and a storage sub-resource absolute ID, an NS (Abs_NS2) corresponding to the NS1 from all NSs corresponding to the VF1. Similarly, the storage controller may obtain, from all I/O queue resources corresponding to the VF1 and according to a correspondence between a relative ID of an I/O queue and an absolute ID of the I/O queue, an I/O queue resource (Abs_Q2) corresponding to the IO1, obtain, from all interrupt resources corresponding to the VF1 and according to a correspondence between a relative ID of an interrupt resource and an absolute ID of the interrupt resource, an interrupt resource (Abs_IRQ2) corresponding to the IRQ1.

Optionally, after obtaining an NS, an I/O queue, and an interrupt resource corresponding to the PF, the storage controller may transmit data in the NS to a physical memory address of the host in a DMA manner. After all data is transmitted to the physical memory of the host in the DMA manner, a controller command in response to the host command may be sent to the host by using the I/O queue resource corresponding to the PF. After transmitting all the data to the physical memory of the host in the DMA manner, the storage controller may generate the controller command, transmit the controller command to the host memory in the DMA manner, and send an interrupt by using the interrupt resource corresponding to the queue, to instruct the host that the command arrives. The host may extract the controller command from the queue in the host.

In this embodiment of the present invention, a storage controller may consolidate a storage medium in a PCIe SSD as a unified storage resource, divide the unified resource into multiple storage sub-resources, further allocate the storage sub-resources to a PF or a VF according to allocation information sent by a host, and store a mapping relationship between the storage sub-resources and the PF or the VF into a resource allocation table. When receiving an I/O command sent by a virtual machine or a virtual machine monitor, the storage controller may search the resource allocation table according to identifier information of a destination PF or a destination VF, and perform, according to the mapping relationship between the storage sub-resources and the PF or the VF, an operation on a storage sub-resource corresponding to the destination PF or the destination VF. The method described in this embodiment of the present invention can support a single-root input/output virtualization technology. Therefore, I/O performance of a storage device and utilization of a storage resource in the storage device are improved.

Embodiment 3

Figure 5:
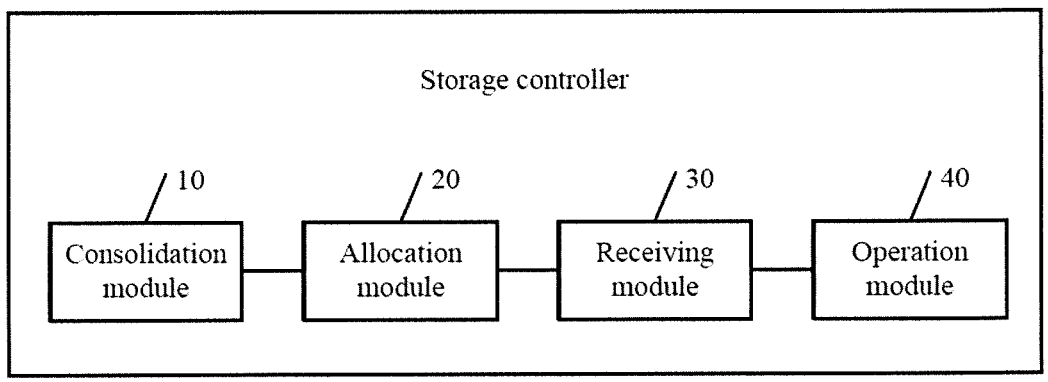
FIG. 5 is a schematic structural diagram of an embodiment of an SR-IOV-supported storage controller according to an embodiment of the present invention.

Referring to FIG. 5, on a basis of the foregoing embodiments, this embodiment of the present invention provides an SR-IOV-supported storage controller, including:

a consolidation module 10, configured to: consolidate a storage medium in a storage device as a unified storage resource, and divide the unified storage resource into multiple storage sub-resources;

an allocation module 20, configured to: allocate, to at least one of the PF or the VF according to a preset allocation rule, the storage sub-resources divided by the consolidation module, and maintain a resource allocation table, where the resource allocation table includes a mapping relationship between the storage sub-resources and at least one of the PF or the VF;

a receiving module 30, configured to receive a host command sent by the virtual machine to a destination VF or sent by the virtual machine monitor to a destination PF; and an operation module 40, configured to: search the resource allocation table according to the destination VF or the destination PF, and perform, on a storage sub-resource corresponding to the destination PF or the destination VF and according to the mapping relationship between the storage sub-resources and the PF or the NT in the resource allocation table, an operation corresponding to the host command received by the receiving module.

In specific implementation, the single-root input/output virtualization-supported storage controller provided in this embodiment of the present invention is the storage controller 200 described in the foregoing embodiments. For a connection relationship between the storage controller 200, the host 100, and the storage medium 300, reference may be made to the foregoing described content. Therefore, details are not described herein again.

Optionally, the storage device described in this embodiment of the present invention may be specifically a PCIe SSD. The storage medium included in the storage device may be specifically NAND flash. In specific implementation, for a specific implementation manner of the modules in the storage controller described in this embodiment of the present invention, reference may be made to steps S101 to S104 in Embodiment 1 of the present invention. Therefore, details are not described herein again.

In this embodiment of the present invention, a storage controller may consolidate a storage medium in a PCIe SSD as a unified storage resource, divide the unified storage resource into multiple storage sub-resources, further allocate the multiple storage sub-resources to a PF or a VF according to allocation information sent by a host, and store a mapping relationship between the storage sub-resources and the PF or the VF into a resource allocation table. When receiving a command sent by a virtual machine or a virtual machine monitor, the storage controller may search the resource allocation table according to an identifier of a PF or a VF receiving the command, and perform an operation on a storage sub-resource according to the mapping relationship between the sub-resources and the PF or the VF. The method described in this embodiment of the present invention can support a single-root input/output virtualization technology. Therefore, I/O performance of a storage device and utilization of a storage resource in the storage device are improved.

Embodiment 4

Figure 6:
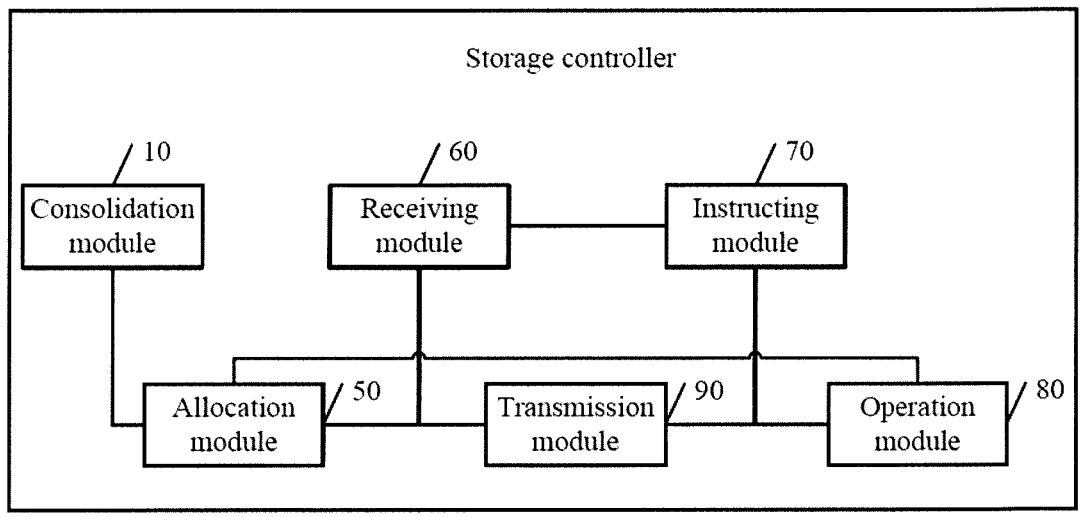
FIG. 6 is a schematic structural diagram of another embodiment of an SR-IOV-supported storage controller according to an embodiment of the present invention.

Referring to FIG. 6, on a basis of the foregoing embodiments, this embodiment of the present invention provides an SR-IOV-supported storage controller. The storage controller described in this embodiment of the present invention includes:

a consolidation module 10, configured to: consolidate a storage medium in a storage device as a unified storage resource, and divide the unified storage resource into multiple storage sub-resources;

an allocation module 50, configured to: allocate, to at least one of the PF or the VF according to a preset allocation rule, the storage sub-resources divided by the consolidation module, and maintain a resource allocation table, where the resource allocation table includes a mapping relationship between the storage sub-resources and at least one of the PF or the VF;

a receiving module 60, configured to receive a host command sent by the virtual machine to a destination VF or sent by the virtual machine monitor to a destination PF; and an operation module 80, configured to: search the resource allocation table according to the destination VF or the destination PF, and perform, on a storage sub-resource corresponding to the destination PF or the destination VF and according to the mapping relationship between the storage sub-resources and the PF or the VF in the resource allocation table, an operation corresponding to the host command received by the receiving module.

Optionally, the receiving module 60 may execute an implementation manner executed by the receiving module 30 described in the foregoing embodiment, and may further be specifically configured to:

after learning that the host puts the host command in the queue in the host memory, initiate a direct memory access DMA operation, to obtain the host command from a queue that is of the queue in the host memory and corresponding to the destination VF or the destination PF.

Optionally, the storage controller provided in this embodiment of the present invention further includes:

a transmission module 90, configured to transmit, to the host memory by using the DMA operation, a controller command that needs to be sent to the host; and an instructing module 70, configured to instruct, by using an interrupt resource corresponding to a destination queue of the destination VF or the destination PF, the host to obtain the controller command.

Optionally, the operation module 80 may execute an implementation manner executed by the operation module 40 described in the foregoing embodiment, and may further be specifically configured to:

find, according to the mapping relationship between the storage sub-resources and the PF or the VF in the resource allocation table, the storage sub-resource corresponding to the destination VF or the destination PF, find, according to a correspondence between a storage sub-resource relative ID and a storage sub-resource absolute ID, a storage sub-resource absolute ID corresponding to a storage sub-resource relative ID carried in the host command, and perform the operation on the storage sub-resource corresponding to the found storage sub-resource absolute ID.

Optionally, the allocation module 50 may execute an implementation manner executed by the allocation module 20 described in the foregoing embodiment, and may further be specifically configured to:

allocate at least one storage sub-resource to the PF according to the preset allocation rule, and store a mapping relationship between the storage sub-resource and the PF into the resource allocation table; or allocate at least one storage sub-resource to one VF according to the preset allocation rule, and store a mapping relationship between the at least one storage sub-resource and the VF into the resource allocation table; or allocate one storage sub-resource to multiple VFs according to the preset allocation rule, and store a mapping relationship between the storage sub-resource and each VF into the resource allocation table.

Optionally, the storage controller described in this embodiment of the present invention is specifically the storage controller described in FIG. 1. For a structure relationship between the storage controller, the host, and the storage medium, reference may be made to content described in the method for implementing a single-root input/output virtualization-supported controller provided in Embodiment 1 of the present invention. Therefore, details are not described herein again.

In specific implementation, the modules in the storage controller described in this embodiment of the present invention may execute the specific implementation manners of the modules described in Embodiment 3, and may further execute the implementation manners described in Embodiment 2. For a specific implementation manner, reference may be made to steps S201 to S205 in Embodiment 2. Therefore, details are not described herein again.

In this embodiment of the present invention, a storage controller may consolidate a storage medium in a PCIe SSD as a unified storage resource, divide the unified resource into multiple storage sub-resources, further allocate the storage sub-resources to a PF or a VF according to allocation information sent by a host, and store a mapping relationship between the storage sub-resources and the PF or the VF into a resource allocation table. When receiving an I/O command sent by a virtual machine or a virtual machine monitor, the storage controller may search the resource allocation table according to identifier information of a destination PF or a destination VF, and perform, according to the mapping relationship between the storage sub-resources and the PF or the VF, an operation on a storage sub-resource corresponding to the destination PF or the destination VF. The storage controller described in this embodiment of the present invention can support a single-root input/output virtualization technology. Therefore, I/O performance of a storage device and utilization of a storage resource in the storage device are improved.

Embodiment 5

Figure 7:
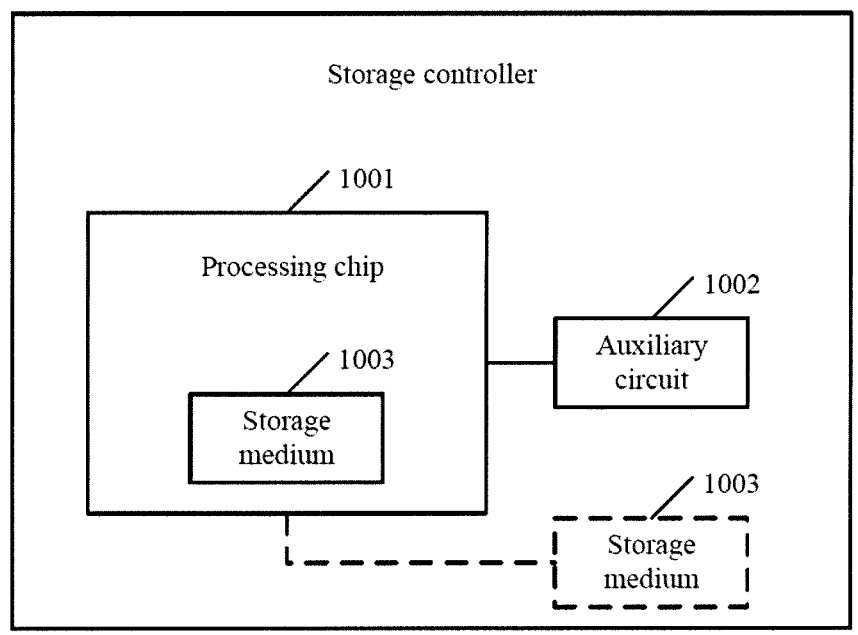
FIG. 7 is a schematic structural diagram of still another embodiment of a storage controller according to an embodiment of the present invention.

Referring to FIG. 7, on a basis of the foregoing embodiments, this embodiment of the present invention provides a storage controller 1000, including a processing chip 1001 and an auxiliary circuit 1002 of the processing chip 1001. The processing chip 1001 may specifically include a field-programmable gate array (Field-Programmable Gate Array, FPGA), an application-specific integrated circuit (Application Specific Integrated Circuit, ASIC), or the like. A storage medium 1003 may be built in the FPGA or the ASIC, or a storage medium 1003 may be mounted externally to the FPGA or the ASIC.

In specific implementation, the FPGA chip or the ASIC chip may be programmed to complete receiving of a read and write request from a host, and perform various access controls on a Flash chip set. Specifically, the storage controller 1000 may be configured to execute the method for implementing an SR-IOV-supported controller provided in the embodiments of the present invention. For details, reference may be made to the specific implementation manners described in the method for implementing an SR-IOV-supported controller provided in Embodiment 1 and Embodiment 2 of the present invention. Therefore, details are not described herein again.

Embodiment 6

Figure 8:
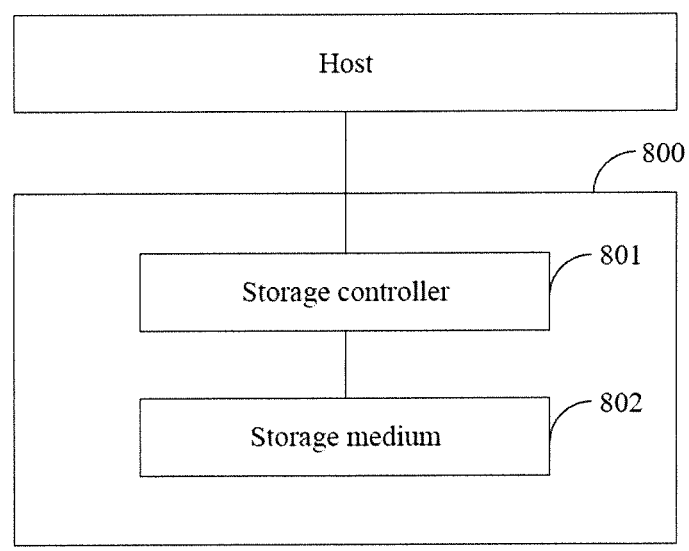
FIG. 8 is a schematic structural diagram of a storage device according to an embodiment of the present invention.

Referring to FIG. 8, on a basis of the foregoing embodiments, this embodiment of the present invention provides a storage device 800, including a storage controller 801 and a storage medium 802. The storage controller 801 is configured to:

consolidate the storage medium as a unified storage resource, and divide the unified storage resource into multiple storage sub-resources;

allocate the storage sub-resources to at least one of the PF or the VF according to a preset allocation rule, and maintain a resource allocation table, where the resource allocation table includes a mapping relationship between the storage sub-resources and at least one of the PF or the VF;

receive a host command sent by a virtual machine to a destination VF or sent by a virtual machine monitor to a destination PF; and search the resource allocation table according to the destination VF or the destination PF, and perform, on a storage sub-resource corresponding to the destination PF or the destination VF and according to the mapping relationship between the storage sub-resources and the PF or the VF in the resource allocation table, an operation corresponding to the host command.

Optionally, in this embodiment of the present invention, a host includes a memory, the memory includes at least one queue, and at least one of the PF or the VF is corresponding to one or more different queues.

When the storage controller is configured to receive the host command sent by the virtual machine to the destination VF or sent by the virtual machine monitor to the destination PF, the storage controller is specifically configured to:

after learning that the host puts the host command in the queue in the host memory, initiate a direct memory access DMA operation, to obtain the host command from a queue that is of the queue in the host memory and corresponding to the destination VF or the destination PF.

Optionally, in this embodiment of the present invention, the storage controller further includes multiple interrupt resources. The multiple interrupt resources are allocated to the queue in the host memory, so that one or more queues are corresponding to one interrupt resource. The storage controller is further configured to:

transmit, to the host memory by using the DMA operation, a controller command that needs to be sent to the host; and instruct, by using an interrupt resource corresponding to a destination queue of the destination VF or the destination PF, the host to obtain the controller command, where the destination queue of the destination VF or the destination PF is the queue that is of the queue in the host memory and corresponding to the destination VF or the destination PF.

Optionally, in this embodiment of the present invention, the interrupt resource is an MSI-x interrupt, and each queue in the host memory is corresponding to one MSI-x interrupt.

Optionally, in this embodiment of the present invention, the host command includes storage sub-resource relative identifiers ID used to identify the storage sub-resources, and the storage sub-resources in the resource allocation table are identified by using storage sub-resource absolute IDs.

When the storage controller is configured to: search the resource allocation table according to the destination VF or the destination PF, and perform, on the storage sub-resource corresponding to the destination PF or the destination VF and according to the mapping relationship between the storage sub-resources and the PF or the VF in the resource allocation table, the operation corresponding to the host command, the storage controller is specifically configured to:

find, according to the mapping relationship between the storage sub-resources and the PF or the VF in the resource allocation table, the storage sub-resource corresponding to the destination VF or the destination PF, find, according to a correspondence between a storage sub-resource relative ID and a storage sub-resource absolute ID, a storage sub-resource absolute ID corresponding to a storage sub-resource relative ID carried in the host command, and perform the operation on the storage sub-resource corresponding to the found storage sub-resource absolute ID.

Optionally, in this embodiment of the present invention, when the storage controller is configured to: allocate the storage sub-resources to at least one of the PF or the VF according to the preset allocation rule, and maintain the resource allocation table, the storage controller is specifically configured to:

allocate at least one storage sub-resource to the PF according to the preset allocation rule, and store a mapping relationship between the storage sub-resource and the PF into the resource allocation table; or allocate at least one storage sub-resource to one VF according to the preset allocation rule, and store a mapping relationship between the at least one storage sub-resource and the VF into the resource allocation table; or allocate one storage sub-resource to multiple VFs according to the preset allocation rule, and store a mapping relationship between the storage sub-resource and each VF into the resource allocation table.

It should be noted that this embodiment of the present invention is based on the foregoing embodiments, and therefore, for specific functions executed by the controller in this embodiment of the present invention, reference may be made to specific descriptions in the foregoing embodiments. Therefore, details are not described herein again.

Embodiment 7

On a basis of the foregoing embodiments, this embodiment of the present invention provides a storage system, including a host and the storage device provided in Embodiment 6. For a schematic structural diagram of the storage system, reference may be made to FIG. 1 and FIG. 8. The host and the storage device are already described in detail in the foregoing embodiments. Therefore, details are not described herein again.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A single-root input/output virtualization (SR-IOV) supported storage resource access method executed by a storage controller in a storage device which comprises a storage medium, the storage controller is configured to connect a host and the storage medium, the host to execute a virtual machine monitor and at least one virtual machine, and the storage controller comprises a physical function (PF) and at least one virtual function (VF) related to the PF, the PF is to directly communicate with the virtual machine monitor, and each VF among the at least one VF is to directly communicate with a corresponding virtual machine among the at least one virtual machine, the method comprising:

consolidating the storage medium as a unified storage resource, and dividing the unified storage resource into multiple storage sub-resources;

allocating, by the storage controller in response to an allocation command including a set allocation rule from the host, the storage sub-resources to the PF and/or any of the at least one VF according to the allocation rule to maintain a resource allocation table comprising a mapping relationship between the storage sub-resources and information of the PF and/or any of the at least one VF, to support a search of the resource allocation table for a storage sub-resource, among the storage sub-resources, according to a host command including the information of the PF and/or any of the at least one VF;

receiving, by the storage controller, the host command, sent by the virtual machine, including information of a destination VF among the at least one VF, or sent by the virtual machine monitor including information of the PF as a destination PF; and searching, by the storage controller, the mapping relationship in resource allocation table according to the information of the destination VF or the destination PF included in the host command to perform an operation corresponding to the host command on the storage sub-resource corresponding to the information of destination PF or the destination VF in the mapping relationship.

2. The method according to claim 1, wherein the host comprises a memory, the memory comprises at least one queue, and the PF and/or any of the at least one VF is corresponding to at least one queue; and the receiving a host command sent by the virtual machine to a destination VF or sent by the virtual machine monitor to a destination PF comprises:

after learning that the host puts the host command in a queue among the at least one queue in the host memory, initiating a direct memory access (DMA) operation, to obtain the host command from the queue in the host memory and corresponding to the destination VF or the destination PF.

3. The method according to claim 2, wherein the storage controller further comprises multiple interrupt resources, the multiple interrupt resources are allocated to the queue in the host memory, so that the at least one queue corresponds to one interrupt resource, and the method further comprises:

transmitting, to the host memory by using the DMA operation, a controller command that needs to be sent to the host; and instructing, by using an interrupt resource corresponding to a destination queue, among the at least one queue, corresponding to the destination VF or the destination PF, the host to obtain the controller command.

4. The method according to claim 3, wherein the interrupt resource is an MSI-x interrupt, and each queue in the host memory is corresponding to one MSI-x interrupt.

5. The method according to claim 1, wherein the host command comprises storage sub-resource relative identifiers ID used to identify the storage sub-resources, and the storage sub-resources in the resource allocation table are identified by using storage sub-resource absolute IDs; and the searching the resource allocation table according to the information of the destination VF or the destination PF to perform an operation corresponding to the host command on the storage sub-resource corresponding to the destination PF or any of the at least one destination VF in the resource allocation table, comprises:

finding, according to the mapping relationship between the storage sub-resources and the information of the PF or any of the at least one VF in the resource allocation table, the storage sub-resource corresponding to the information of the destination VF or the destination PF, finding, according to a correspondence between a storage sub-resource relative ID and a storage sub-resource absolute ID, a storage sub-resource absolute ID corresponding to a storage sub-resource relative ID carried in the host command, and performing the operation on the storage sub-resource corresponding to the found storage sub-resource absolute ID.

6. The method according to claim 1, wherein the allocating the storage sub-resources to the PF and/or the VF according to a set allocation rule, and maintaining a resource allocation table comprises:

allocating at least one storage sub-resource to the PF according to the set allocation rule, and storing a mapping relationship between the storage sub-resource and the PF into the resource allocation table; or allocating at least one storage sub-resource to one VF according to the set allocation rule, and storing a mapping relationship between the at least one storage sub-resource and the VF into the resource allocation table; or allocating one storage sub-resource to multiple VFs according to the set allocation rule, and storing a mapping relationship between the storage sub-resource and each VF into the resource allocation table.

7. The method according to claim 1, wherein the PF is configured to execute a global storage controller function, and the global storage controller function comprises at least one of implementation of a Firmware Download or Firmware Active command, implementation of a Format command, or a power-off function in total reset.

8. A single-root input/output virtualization (SR-IOV) supported storage controller, wherein the storage controller is configured to connect a host and a storage medium, the host executes a virtual machine monitor and at least one virtual machine, the storage controller comprising:

at least one hardware processor to control, including by execution of a program, to, implement a physical function (PF) and at least one virtual function (VF) related to the PF, the PF is to directly communicate with the virtual machine monitor, and each VF among the at least one VF is to directly communicate with a virtual machine among the at least one virtual machine;

consolidate the storage medium as a unified storage resource, and divide the unified storage resource into multiple storage sub-resources;

allocate, in response to an allocation command including an allocation rule from the host, the storage sub-resources to the PF and/or any of the at least one VF according to the allocation rule to maintain a resource allocation table that comprises a mapping relationship between the storage sub-resources and information of the PF and/or any of the at least one VF, to support a search of the resource allocation table for a storage sub-resource, among the storage sub-resources, according to a host command including information of the PF and/or any of the at least one VF;

receive the host command sent by the virtual machine, including information of a destination VF among the at least one VF, or sent by the virtual machine monitor including information of the PF as a destination PF; and search the mapping relationship in resource allocation table according to the information of the destination VF or the destination PF included in the host command to perform an operation corresponding to the host command on the storage sub-resource corresponding to the information of destination PF or the destination VF in the mapping relationship.

9. The storage controller according to claim 8, wherein the host comprises a memory, the memory comprises at least one queue, and the PF and/or any of the at least one VF is corresponding to at least one queue; and the at least one hardware processor is to:
after learning that the host puts the host command in a queue among the at least one queue in the host memory, initiate a direct memory access (DMA) operation, to obtain the host command from the queue in the host memory and corresponding to the destination VF or the destination PF.

10. The storage controller according to claim 9, wherein the storage controller further comprises multiple interrupt resources, the multiple interrupt resources are allocated to the queue in the host memory, so that the at least one queue corresponds to one interrupt resource; and the at least one hardware processor is to:
transmit, to the host memory by using the DMA operation, a controller command that needs to be sent to the host; and instruct, by using an interrupt resource corresponding to a destination queue, among the at least one queue, corresponding to the destination VF or the destination PF, the host to obtain the controller command.

11. The storage controller according to claim 10, wherein the interrupt resource is an MSI-x interrupt, and each queue in the host memory is corresponding to one MSI-x interrupt.

12. The storage controller according to claim 8, wherein the host command comprises storage sub-resource relative identifiers ID used to identify the storage sub-resources, and the storage sub-resources in the resource allocation table are identified by using storage sub-resource absolute IDs; and the hardware processor is to:
find, according to the mapping relationship between the storage sub-resources and the information of the PF or any of the at least one VF in the resource allocation table, the storage sub-resource corresponding to the information of the destination VF or the destination PF, find, according to a correspondence between a storage sub-resource relative ID and a storage sub-resource absolute ID, a storage sub-resource absolute ID corresponding to a storage sub-resource relative ID carried in the host command, and perform the operation on the storage sub-resource corresponding to the found storage sub-resource absolute ID.

13. The storage controller according to claim 8, wherein the hardware processor is to:

allocate at least one storage sub-resource to the PF according to the allocation rule, and store a mapping relationship between the storage sub-resource and the PF into the resource allocation table; or allocate at least one storage sub-resource to one VF according to the allocation rule, and store a mapping relationship between the at least one storage sub-resource and the VF into the resource allocation table; or allocate one storage sub-resource to multiple VFs according to the allocation rule, and store a mapping relationship between the storage sub-resource and each VF into the resource allocation table.

14. The storage controller according to claim 8, wherein the PF is configured to execute a global storage controller function, and the global storage controller function comprises at least one of implementation of a Firmware Download or Firmware Active command, implementation of a Format command, or a power-off function in total reset.

15. A storage device, comprising a storage controller and a storage medium, wherein the storage controller is connected to the storage medium and configured to connect a host, so that the host reads and writes data in the storage medium by using the storage controller, the host executes a virtual machine monitor and at least one virtual machine, the storage controller comprises a physical function (PF) and at least one virtual function (VF) related to the PF, the PF is to directly communicate with the virtual machine monitor, and each VF among the at least one VF is to directly communicate with a corresponding virtual machine among the at least one virtual machine; and the storage controller is configured to:

consolidate the storage medium as a unified storage resource, and divide the unified storage resource into multiple storage sub-resources;

allocate, in response to an allocation command including an allocation rule from the host, the storage sub-resources to the PF and/or any of the at least one VF according to the allocation rule to maintain a resource allocation table comprising a mapping relationship between the storage sub-resources and information of the PF and/or any of the at least one VF, to support a search of the resource allocation table for a storage sub-resource, among the storage sub-resources, according to a host command including information of the PF and/or any of the at least one VF;

receive the host command, sent by the virtual machine, including information of a destination VF among the at least one VF, or sent by the virtual machine monitor including information of the PF as a destination PF; and search the mapping relationship in resource allocation table according to the information of the destination VF or the destination PF included in the host command to perform an operation corresponding to the host command on the storage sub-resource corresponding to the information of destination PF or the destination VF in the mapping relationship.

16. The storage device according to claim 15, wherein the host comprises a memory, the memory comprises at least one queue, and the PF and/or any of the at least one VF is corresponding to at least one queue; and when the storage controller is configured to receive the host command sent by the virtual machine to the destination VF or sent by the virtual machine monitor to the destination PF, the storage controller is specifically configured to:

after learning that the host puts the host command in a queue among the at least one queue in the host memory, initiate a direct memory access (DMA) operation, to obtain the host command from the queue in the host memory and corresponding to the destination VF or the destination PF.

17. The storage device according to claim 16, wherein the storage controller further comprises multiple interrupt resources, the multiple interrupt resources are allocated to the queue in the host memory, so that at least one queue corresponds to one interrupt resource, and the storage controller is further configured to:

transmit, to the host memory by using the DMA operation, a controller command that needs to be sent to the host; and instruct, by using an interrupt resource corresponding to a destination queue, among the at least one queue, corresponding to the destination VF or the destination PF, the host to obtain the controller command.

18. The storage device according to claim 17, wherein the interrupt resource is an MSI-x interrupt, and each queue in the host memory is corresponding to one MSI-x interrupt.

19. The storage device according to claim 15, wherein the host command comprises storage sub-resource relative identifiers ID used to identify the storage sub-resources, and the storage sub-resources in the resource allocation table are identified by using storage sub-resource absolute IDs; and when the storage controller is configured to search the resource allocation table according to the information of the destination VF or any of the at least one destination PF to perform an operation corresponding to the host command on the storage sub-resource corresponding to the information of the destination PF or any of the at least one destination VF in the resource allocation table, the storage controller is further configured to:

find, according to the mapping relationship between the storage sub-resources and the information of the PF or any of the at least one VF in the resource allocation table, the storage sub-resource corresponding to the information of the destination VF or the destination PF, find, according to a correspondence between a storage sub-resource relative ID and a storage sub-resource absolute ID, a storage sub-resource absolute ID corresponding to a storage sub-resource relative ID carried in the host command, and perform the operation on the storage sub-resource corresponding to the found storage sub-resource absolute ID.

20. The storage device according to claim 15, wherein when the storage controller is configured to allocate the storage sub-resources to the PF and/or the VF according to the allocation rule, and maintain the resource allocation table, the storage controller is specifically configured to:

allocate at least one storage sub-resource to the PF according to the allocation rule, and store a mapping relationship between the storage sub-resource and the PF into the resource allocation table; or allocate at least one storage sub-resource to one VF according to the allocation rule, and store a mapping relationship between the at least one storage sub-resource and the VF into the resource allocation table; or allocate one storage sub-resource to multiple VFs according to the allocation rule, and store a mapping relationship between the storage sub-resource and each VF into the resource allocation table.

* * * * *